United States Patent [19]

Jones et al.

[11] Patent Number: 5,138,157
[45] Date of Patent: Aug. 11, 1992

[54] NEUTRAL PARTICLE BEAM PROPAGATION DIRECTION DETERMINING APPARATUS AND METHOD

[75] Inventors: Yolanda D. Jones; Matthew G. McHarg; LeAnn D. Brasure, all of Albuquergue, N. Mex.; Daniel M. Mulder, Holland, Mich.

[73] Assignee: The United States of America as represented by the Secretary of the Air Force, Washington, D.C.

[21] Appl. No.: 137,488

[22] Filed: Dec. 23, 1987

[51] Int. Cl.⁵ .............................. H05H 3/00
[52] U.S. Cl. ..................... 250/251; 250/397; 250/399; 250/491.1; 324/71.3
[58] Field of Search ........... 250/251, 397, 399, 491.1; 324/71.3

[56] References Cited

U.S. PATENT DOCUMENTS

| | | | |
|---|---|---|---|
| 3,435,214 | 3/1969 | Bernstein et al. | 250/71.5 |
| 4,480,185 | 10/1984 | Hashimoto | 250/251 |
| 4,576,777 | 3/1986 | Weber | 376/153 |
| 4,700,068 | 10/1987 | McClung et al. | 250/251 |
| 4,701,616 | 10/1987 | West et al. | 250/251 |

*Primary Examiner*—Bruce C. Anderson
*Assistant Examiner*—Jack I. Berman
*Attorney, Agent, or Firm*—Donald J. Singer; Jacob N. Erlich; Richard J. Donahue

[57] ABSTRACT

The direction of propagation of a neutral particle beam is determined by positioning a shadow wire in the beam and positioning an array of detector wires downstream from the shadow wire. The shadow wire forms a shadow region downstream thereof, i.e., a region which is depleted of particles due to multiple scattering events. The detector wires are each formed of a different material and the count rate of K shell X-rays emitted from the individual detector wires are used to determine the loction of the centroid of the shadow at the detector wire array. The location of the center of the shadow wire and the position of the downstream shadow centroid are used to establish the direction of beam propagation.

5 Claims, 1 Drawing Sheet

NEUTRAL PARTICLE BEAM PROPAGATION DIRECTION DETERMINING APPARATUS AND METHOD

STATEMENT OF GOVERNMENT INTEREST

The invention described herein may be manufactured and used by or for the Government for governmental purposes without the payment of any royalty thereon.

BACKGROUND OF THE INVENTION

This present invention concerns a method and apparatus for determining the precise direction of propagation of a neutral particle beam Various wire shadow methods and related devices have been heretofore proposed for sensing the energy of a neutral particle beam so as to accurately determine its direction of propagation By a wire shadow method is meant a method of sensing the shadow of reduced beam particle density downstream of an interposed shadow forming wire so as to determine the centroid of the shadow and thereby establish the direction of propagation of the beam. In one such method, the current passing through a detector wire positioned downstream of the shadow wire is measured; and in another, the intensity of the visible fluorescence emitted from a coating on a downstream detector wire is measured.

It has been observed, however, that the current produced through such a downstream detector wire is not linearly related to the intensity of the beam, as is desirable, because of multiple current producing interactions. It has been also found that the speed and resolution provided by the aforementioned fluorescent coating method are not sufficient for certain applications.

OBJECTS AND SUMMARY OF THE INVENTION

It is therefore the primary object of the present invention to provide a device and method for rapidly and accurately determining the direction of propagation of a neutral particle beam.

In accordance with the present invention, a front wire, called the shadow wire, is placed near the center of a neutral particle beam. This wire strips electrons from particles in the beam and all particles have their divergence increased due to multiple scattering events. The result is that a shadow, i.e., a region of reduced particle density having a centroid, is formed downstream of the shadow wire.

An array of detector wires made of different high atomic number metals is positioned downstream from the shadow wire. The detector wires are oriented exactly the same as the shadow wire such that the minimum particle density centroid of the shadow falls on the array of detector wires. An X-ray detection system is used to determine the relative number of particles that strike each wire, and the centroid of the shadow is determined by fitting a shadow shape to the number of counts in each wire. Since the location of the center of the shadow wire is known, and the location of the downstream centroid of the shadow is determined, the beam direction can be established with accuracy.

The foregoing and other objects, advantages and features of the present invention will become apparent from the following detailed description of the preferred embodiment thereof, as illustrated in the accompanying drawings

DETAILED DESCRIPTION OF THE INVENTION

Figure 1:
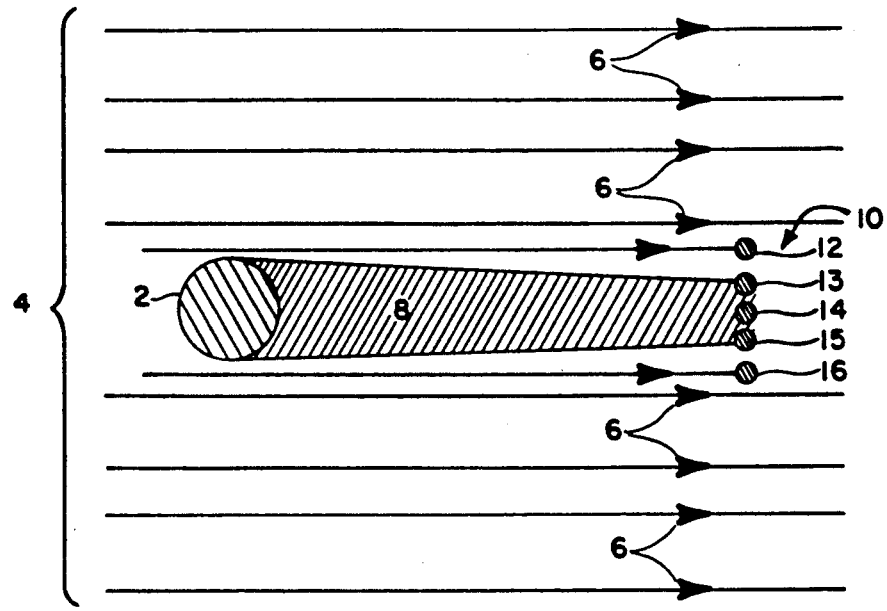
FIG. 1 is a cross sectional geometric representation of the preferred embodiment of the apparatus of the present invention.

As previously mentioned, the invention involves a novel concept for performing neutral particle beam sensing. FIG. 1 shows the basic geometry of a device for implementing this concept in which a front wire 2, called a shadow wire, is placed near the center of a neutral particle beam 4 which propagates in the general direction indicated by the arrowheads 6. Beam 4 is composed of three components, i.e., positive, negative and neutral components. Shadow wire 2, which is preferably made of a low Z material, strips electrons from particles in beam 4, and all particles have their divergence increased due to multiple scattering events. This increase in the divergence of the particles passing by shadow wire 2 causes a shadow 8 to appear downstream of wire 2. Shadow B represents a reduction in the particle density downstream of shadow wire 2.

The precise direction of propagation of beam 4 is determined by locating two points of minimum particle density in shadow 8 which are separated by a known distance. The center of shadow wire 2 itself defines one point of minimum particle density, and the other point is the shadow centroid on downstream detector wire array 10.

Detector wire array 10 is comprised of a plurality of wires, such as wires 12-16 which are oriented exactly the same as shadow wire 2. The centroid of shadow 8 falls on detector wire array 10. The wires not in the shadow 8 are struck by a larger number of beam particles than are the wires in shadow S.

A unique method of detection which is discussed in detail below is used to determine the relative number of beam particles that strike each detector wire 12-16. The centroid of shadow 8 is then determined by the number of counts from each detector wire. Since two points along the axis of the shadow are now known, the direction of beam propagation can be calculated to the measurement accuracy of the shadow centroid.

The method of detection proposed herein for establishing how many beam particles strike each wire 12-16 of detector array 10 involves the observation of the characteristic K shell X-rays that are emitted from each detector wire 12-16 when struck by beam 4 If each detector wire 12-16 is made out of a different material, the characteristic X-rays emitted therefrom will vary in energy.

These characteristic X-rays arise because as the beam strikes a detector wire, there is a probability that the inner electron cloud will become excited and an electron in one of the excited states will decay to a lower energy level. The difference between the two atomic energy levels will determine the energy of the emitted photon. The detector wires 12-16 are made of heavy material, and thus the X-rays produced by emission are in the 50-70 KeV region. When averaged over many target atoms, a dominant energy line is seen for each material.

This dominant line is characteristic of the detector wire atom type since energy levels in dissimilar detector wire materials are different. It is therefore possible to differentiate between the signals coming from different detector wires 12-16 by resolving the energy of the photons.

The spacing between the transitions in the materials listed in the table below which might be selected for the detector wires is approximately 2 KeV. This 2 KeV difference is resolvable by modern X-ray detectors.

TABLE OF TYPICAL DETECTOR WIRE MATERIALS AND PROPERTIES

| Element | Emitted X-Ray Energy (keV) | Melting Temp (C.) | X-Ray Prod. Cross-section (barns) | Density (gm/cm) |
|---|---|---|---|---|
| Hafnium | 55.7 | 2227 | 24.8 | 13.3 |
| Tantalum | 57.5 | 2996 | 23.3 | 16.6 |
| Tungsten | 59.3 | 3410 | 22.0 | 19.3 |
| Rhenium | 61.1 | 3180 | 20.8 | 21.0 |
| Iridium | 64.8 | 2410 | 18.7 | 22.4 |
| Platinum | 66.8 | 1772 | 18.3 | 21.4 |
| Gold | 68.8 | 1064 | 17.5 | 18.9 |

In the detection method disclosed herein, the X-ray detector has only to resolve the detector output in terms of energy and not in terms of spatial extent. The method is also normalized to beam current fluctuations. As the current in the beam fluctuates, the observed count rate in all of the detector wires 12-16 will go up and down together. Since the count rates from all of the detector wires 12-16 are monitored simultaneously, the current fluctuation is normalized. The use of energy resolution and built-in current normalization are important features of the present invention.

Another important feature of this detection method is the low amount of background noise in the X-ray region. The high Z materials produce characteristic X-rays in an energy region much higher than that of lower Z materials. This observation leads to the selection of detector wire 12-16 materials which do not commonly occur in beam lines. Background due to Bremsstrahlung radiation will also be lower in energy than the K shell X-rays emitted from the detector wires.

In one experiment, it was found that the lower energy X-rays could be discriminated against by a combination of hardware and software It is also possible that coatings may be applied to the detector wires that allow transmission of X-rays only in the spectral region of interest.

The method of the present invention lends itself to use in a closed loop control system. The control implementation can be based on the concept of steering the beam so that the shadow centroid falls on the middle detector wire 14, which is positioned directly behind shadow wire 2. The entire assembly is then slaved to an optical target tracker, and beam 4 is thus pointed along a line intercepting shadow wire 2 and detector wire 14. Therefore, when the target tracker has a target centered in its frame, the beam is pointed at the target.

In a recent experimental test of the invention, the shadow wire was made of nichrome and had a radius of about 75 micrometers There were five detector Wires in the detector array which were made Of paladium, silver, tungsten, gold and tantalum, respectively. Each detector wire had a radius of about 25 micrometers and was positioned about 45 centimeters downstream of the shadow wire.

Figure 2:
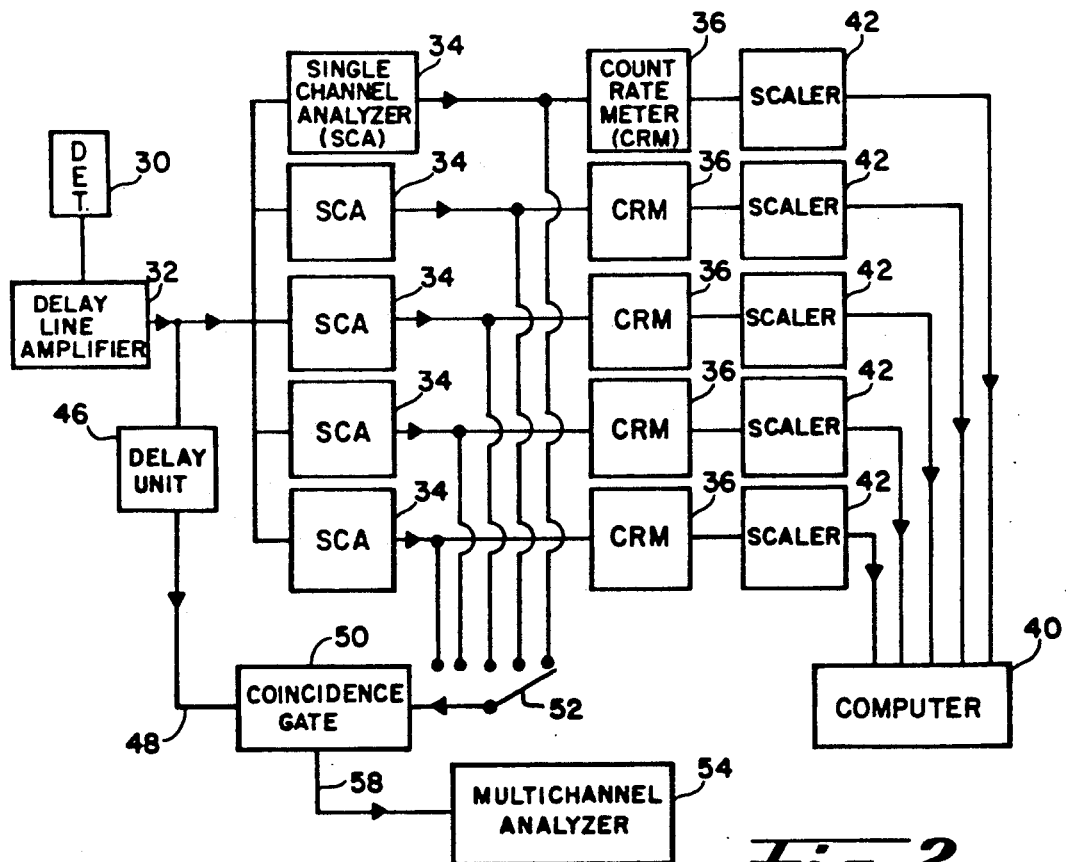
FIG. 2 is a block diagram representation of a data acquisition system adapted for use with the present invention.

FIG. 2 is a block diagram representation of a data acquisition and processing system formed of conventional units which can be used to determine the X-ray count rate of each detector wire, output the data to a computer, and also provide a visual check of the count rate on each detector wire The system comprises an X-ray detector 30 and a delay line amplifier 32 coupling signals therefrom to a plurality of single channel analyzers 34 (one for each detector wire) Output signals from each analyzer 34 are coupled to an associated channel count rate meter 36, and thence to a computer 40 via a scaler unit 42. Computer 40, which is of conventional design, is used to process the count rates derived from the various detector channels and calculate the shadow centroid.

Signals from delay line amplifier 32 are also coupled via a delay unit 46 to one input 48 of a coincidence gate 50. The other input of gate 50 receives a signal from the output of the analyzer 34 selected by selector switch 52. A multichannel analyzer 54 is coupled to the output 58 of gate 50 and provides a visual check of the count rate to each detector wire.

While the invention has been described with reference to a particular embodiment thereof, it will be understood by those skilled in the art that the invention is capable of a variety of alternative embodiments that come within the spirit and scope of the appended claims For example, two shadow wire and detector wire array devices could be used in tandem to improve the shadow definition. Also, a second detector wire array could be positioned orthogonal to the first array that would facilitate a scoring or two dimensional system.

What is claimed is:

1. A method for determining the direction of propagation of a neutral particle beam, said method comprising the steps of:
   (a) positioning a shadow wire near the center of a neutral particle beam;
   (b) positioning a plurality of detector wires in said neutral particle beam and downstream from said shadow wire;
   (c) measuring the X-ray emission derived from each of said detector wires to determine the centroid of the depleted particle region shadow downstream of said shadow wire; and
   (d) determining the direction of propagation of said beam in accordance with the location of said shadow wire and the location of said centroid of said shadow on said detector wires.

2. A method as defined in claim 1 wherein each of said plurality of detector wires is formed of a different material and wherein step (c) comprises the measuring of the K shell X-ray emission rate of each of said plurality of detector wires.

3. Apparatus for determining the direction of propagation of a neutral particle beam, said apparatus comprising:
   a shadow wire disposed near the center of a neutral particle beam;
   an array of detector wires disposed in said neutral particle beam downstream from said shadow wire;
   and means associated with individual ones of said detector wires for determining the K-shell X-ray energy emitted from each of said detector wires.

4. Apparatus as defined in claim 3 wherein each of said detector wires is made of a different material.

5. Apparatus as defined in claim 4 wherein each of said detector wires has its longitudinal axis oriented in the same direction as the longitudinal axis of said shadow wire.

* * * * *